Oct. 25, 1932.  E. A. WHITE ET AL  1,884,999
EDIBLE ENTITY SIZING MECHANISM AND METHOD
Original Filed Feb. 18, 1930  3 Sheets-Sheet 1

INVENTOR
Edward A. White
BY Ira W. Knight
Carl H. Crawford
ATTORNEY

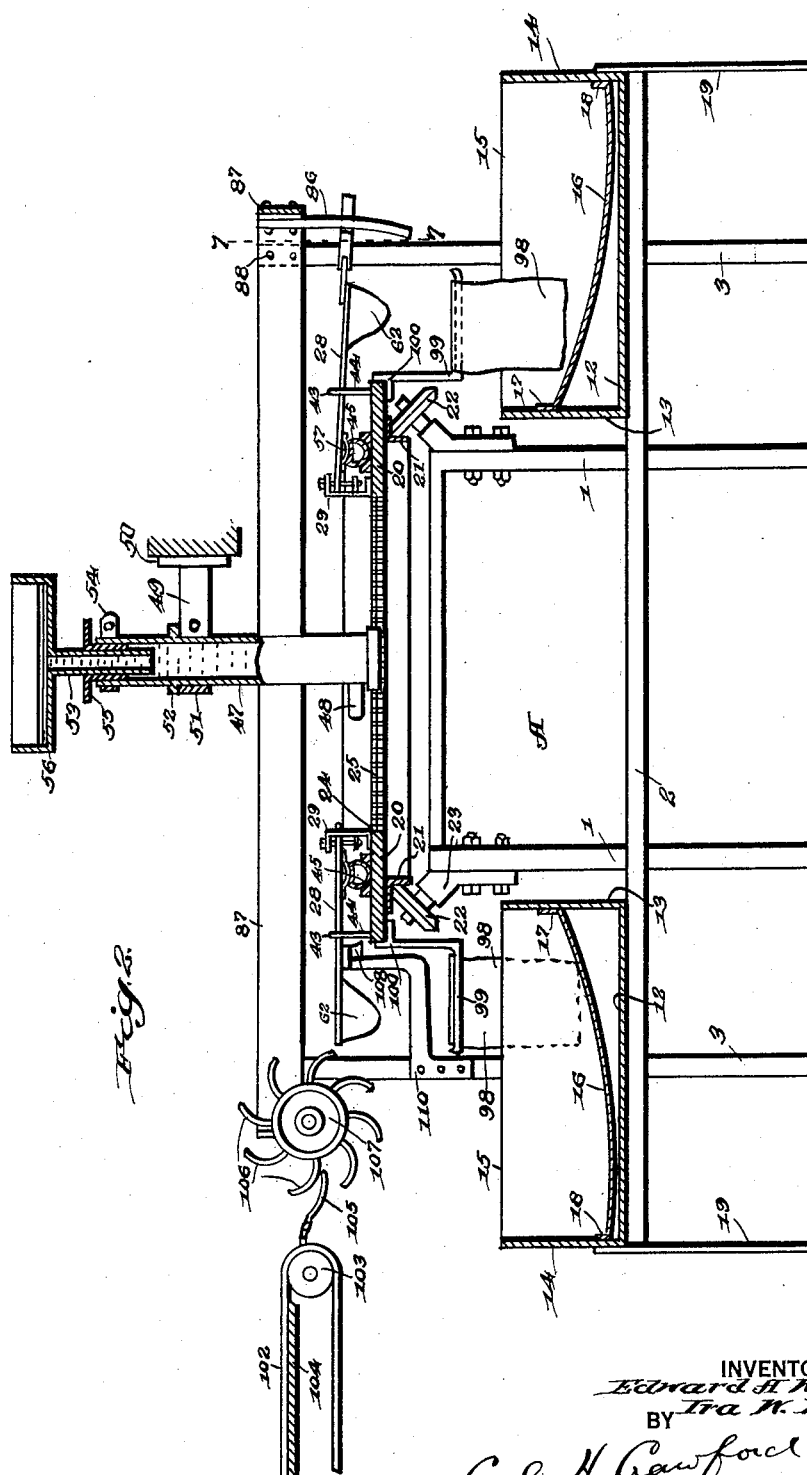

Oct. 25, 1932.  E. A. WHITE ET AL  1,884,999
EDIBLE ENTITY SIZING MECHANISM AND METHOD
Original Filed Feb. 18, 1930   3 Sheets-Sheet 3
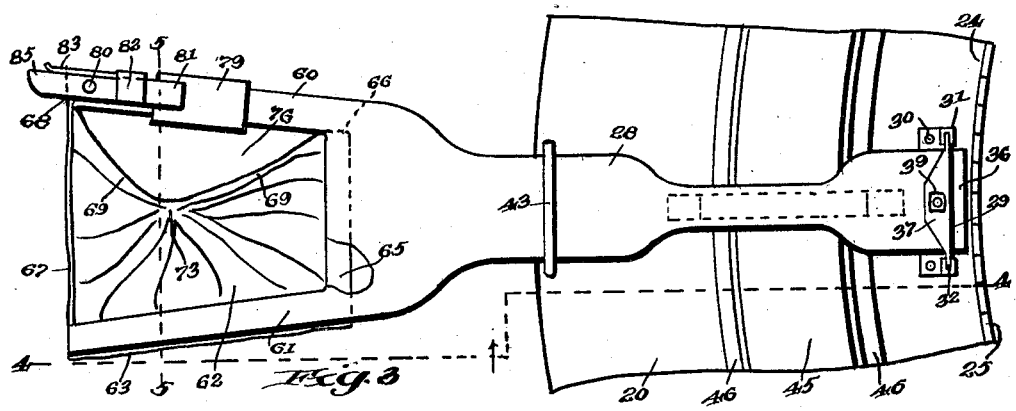
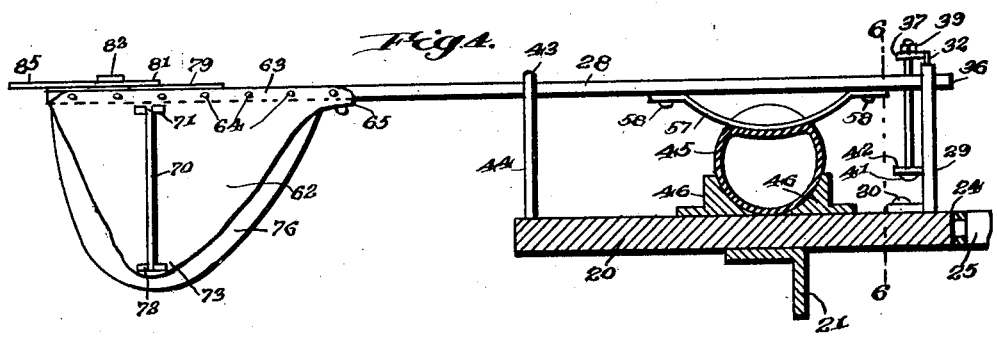
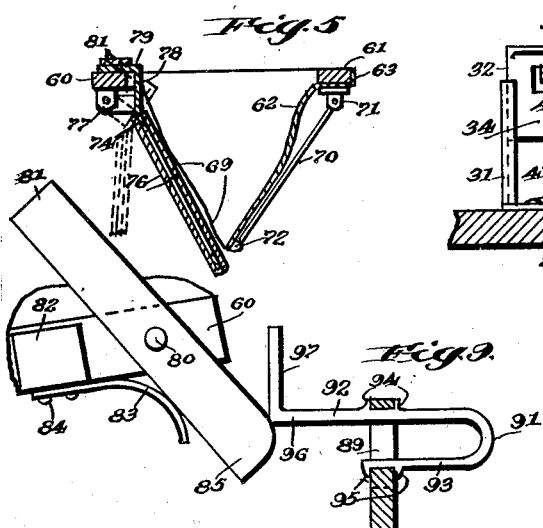
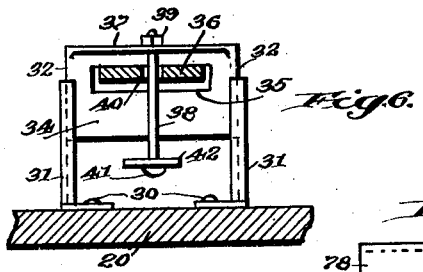
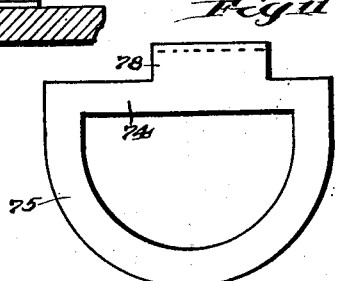
INVENTOR
Edward A. White
BY Ira H. Knight
Carl H. Crawford
ATTORNEY Patented Oct. 25, 1932

1,884,999

UNITED STATES PATENT OFFICE

EDWARD A. WHITE AND IRA W. KNIGHT, OF LEWISTON, IDAHO

EDIBLE ENTITY SIZING MECHANISM AND METHOD

Application filed February 18, 1930, Serial No. 429,254. Renewed July 27, 1932.

This invention relates to an improved method and means for sizing edible entities such as fruit and vegetables.

In order successfully to handle frangible entities such for instance as tomatoes, without puncture or other injury to the skin thereof, or in fact any entity within the category named, it is a desideratum of this invention to perform the function of segregating the entities of different sizes into separate groups without physically gauging the peripheries thereof.

It is therefore an object of this invention to perform the segregation of the entities into different groups by weight, not in the matter of ounces or pounds but rather in the differential of weight of different sized entities, certain sized entities having a generally fixed weight.

It is a feature of this invention to afford means for distinguishing the weight of entities irrespective of the order or sequence in which the latter are delivered to the machine thereby avoiding the expense of disposing the entities in any predetermined order prior to delivery thereof to the machine.

It is a further feature of the invention that the entities are immediately classified, by weight, just as soon as they are delivered to the machine and can only be ejected into a bin or container in which entities of a like size have been or are intended to be disposed.

A feature of the invention consists in a series of weighing devices each adapted to carry an entity and a rebound or counter balance means common to all of said devices and sensitively responsive to the weight of entities of each weighing device.

It is an object of the invention to provide means for causing delivery or ejectment of the entities from the weighing devices responsive to the inclination of the latter under the weight of the entity carried thereby, as a direct result of which we are able to make indescriminate delivery to the machine and obtain accurate classification ejectment from the machine.

The invention has many other objects and features which will be more particularly described in connection with the accompanying drawings and will be more specifically pointed out in and by the appended claims.

In the drawings:—

Fig. 2 is a vertical sectional view on line 2—2 of Fig. 1.

Fig. 3 is a plan view of one of the entity carrying weighing devices.

Fig. 4 is a sectional view on line 4—4 of Fig. 3, looking in the direction of the arrow.

Fig. 5 is a sectional view on line 5—5 of Fig. 3, looking to the right of said figure.

Fig. 6 is a sectional view on line 6—6 of Fig. 4, looking toward the right thereof.

Fig. 9 is a plan sectional view on line 9—9 of Fig. 8.

Fig. 11 is a view in side elevation of a closing section frame.

Like characters of reference designate similar parts throughout the different figures of the drawings.

Figure 1:
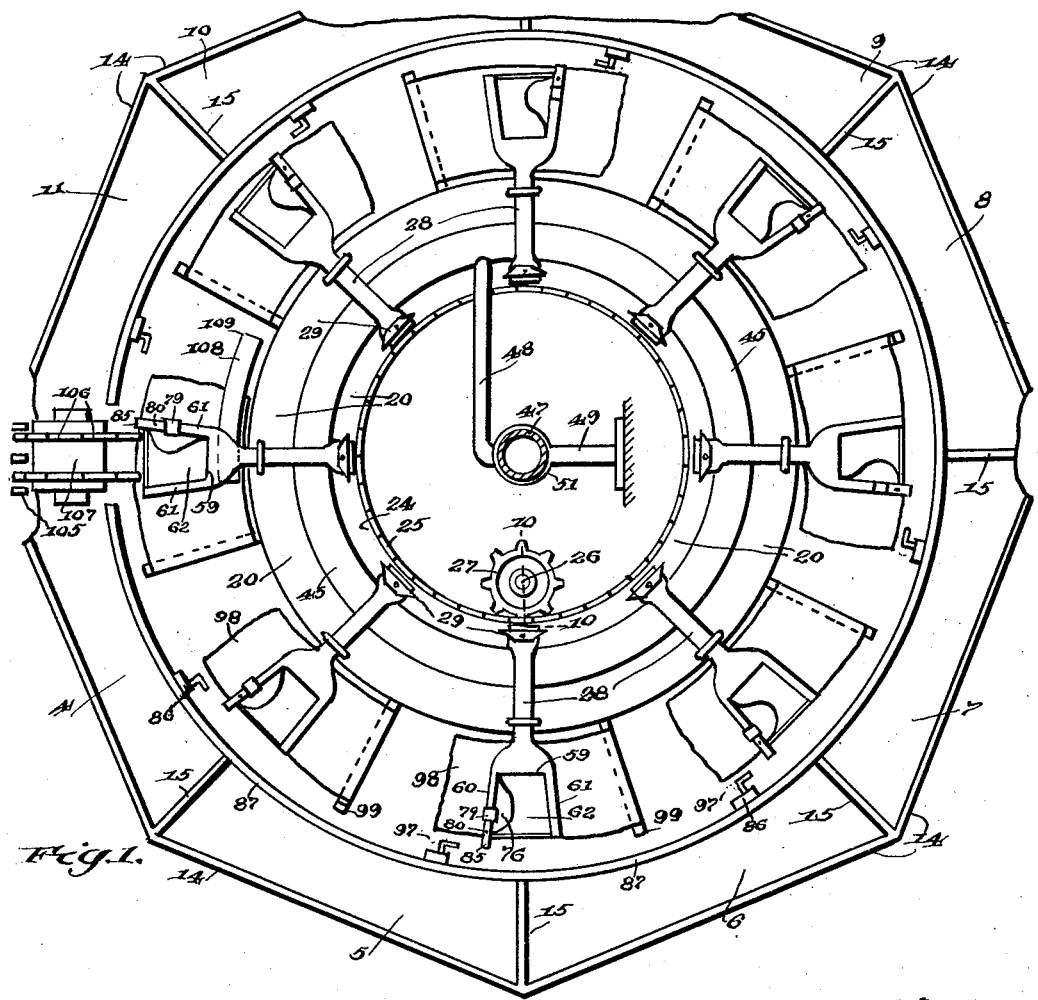
Fig. 1 is a plan view showing the device of this invention in the most preferred form.

The device of this invention involves traveling devices which are continually advanced in the performance of their function, and in the present embodiment, said devices are advanced in a circular path of travel but it is to be understood that this circular form of the machine herein shown, is not an essential form, although this form has many advantageous features.

The structure shown, includes a generally circular frame which may comprise vertical members 1, disposed in radial spaced relation to the vertical axis of the machine in a manner to form what may be termed a central well or well space. The frame also includes horizontal radially extending members 2, mounted on frame members 1, and extending radially outwardly therefrom past outer vertical members 3, to which latter they may be secured. These horizontal members are suitably distributed to form a support for a series of annularly disposed fruit or vegetable receiving bins or receptacles, all of which may be alike in form and size, and which have been designated generally at 4 to 11. Each bin may consist of a bottom wall 12, radially inner and outer walls 13 and 14, respectively, and side or dividing walls 15, which latter function to partition the bins from each other, thereby segregating the classified and sized entities. In order to cushion descent of the fruit or vegetable entities into said bins and to prevent possible injury to the former, it is a feature to provide the bins with false bottoms which may consist of fabric such as canvas 16, secured at 17, above the bottom 12, and at 18, to wall 14, whereby the entities will not only be cushioned but will roll radially outwardly and be readily accessible from the exposed upper portions of the bins, as will be clear from Fig. 2.

These bins which are all substantially alike in form and structure and which therefore need not be individually described, may be termed segregating or classifying bins. Because the load on the bins is primarily outwardly disposed, legs 19 may be employed as supports therefor, as shown in Fig. 2.

Reference will next be made to travelling elements of the invention and initially to what be termed a travelling base which, in the present form of the invention is embodied in a circular or ring-like base that is horizontally disposed and is generally indicated at 20. The means employed for revolubly mounting said base 20, also functions to center the same and as shown, said means includes a bearing ring or track of angle iron 21, secured to base 20, as shown in Fig. 2, and projecting from the bottom thereof. Bearing discs or rollers 22, of suitable number, are journalled in bearing brackets 23, secured to uprights 1, and have V-shaped peripheries to fit the angle iron 21 and by reason of the angular disposition of said rollers 22, the base 20, is held to a fixed path of circular travel. It will be clear from Figs. 1 and 2, that the ring base 20 is disposed in a manner not to obstruct the central well space which may be designated at A.

Reference will next be made to an improved means for imparting rotative movement to base 20 in such a manner as not to obstruct the central well space A.

To the inner periphery 24, of base 20, is secured a flexible chain 25, such for instance as a bicycle chain or any other suitable form of link propulsive chain adapted for light duty service. This chain 25, is secured or suitably anchored throughout its length, to base 20 so as to form, to all intents and purposes, a stationary part thereof or thereto and to rotate therewith. A shaft 26, driven from any suitable source of power, has a sprocket wheel 27, which meshes with chain 25 and rotates base 20 in the direction of the arrow in Fig. 1.

Figure 10:
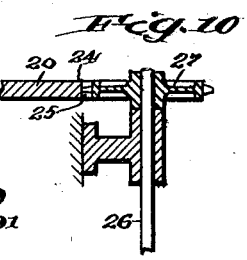
Fig. 10 is a sectional view on line 10—10 of Fig. 1.

The location of the sprocket wheel 27, with respect to the interior of base 20, is shown in Fig. 1, and in Fig. 10, a vertical sectional view is shown. This construction completely fulfills the light duty and relatively low speed requirements and results in a great saving in cost as compared to a gear ring.

Reference will next be made to the improved weighing devices.

As all of these devices are identical in function and structure, only one need be described in detail. Each weighing device includes a tiltable weighing beam 28 and these beams are radially distributed as will be seen by reference to Fig. 1, although in actual practice, the beams will be disposed in close juxtaposition to afford increased capacity. The radially inner end of each beam is movably and pivotally mounted, and is also adjustable for different weight entities, in a pivotal device which is shown more particularly in Figs. 3, 4 and 6.

As shown, each pivotal device includes an upright 29, fixed at 30, near the inner periphery of base 20. The edges of said upright 29, are formed into guides 31, in which the edges 32 of a slide 34, are vertically movable. Said slide 34 is provided with a horizontal slot 35 through which the end 36, of beam 28, loosely projects with a certain freedom of vertical play, as will be seen from Fig. 6. The upper margin 37, of slide 34, is bent over to form a ledge and a pivot bolt 38, having an adjusting nut 39, extends downwardly through said ledge and through an opening 40, in beam 28. The head end 41, of said bolt extends through a flange 42, projecting from said upright 29. This adjustable mounting interdependently coacts with a counter-balance which will next be described and which normally maintains the end 36, of beam 28, in engagement with the upper edge of slot 35, as shown in Fig. 6.

It will now be clear that by means of this adjustment, the simple turning of nut 39, will adapt the weighing devices to relatively heavy, medium or light weight entities, as will presently be made clear.

As a means of insuring movement of the beams 28 with the base 20 propulsive guides are provided and as shown, said guides take the form of relatively large staples, the bight 43, extending over the top of beam 28, and limiting upward tilting movement of the latter, and the limbs 44 performing the propulsive guiding function of insuring movement of the beam 28 with the base 20, irrespective of the position to which the beam 28 is tilted. These guides relieve the pivotal devices of excessive stress.

Reference will next be made to an improved counter-balance the novel feature of which is that it is common to all of the weighing beams 28.

This counter-balance is interposed between the pivotally connected end 36, of the beam 28, and that end of the latter in which the entity is carried, and as shown, said counter-balance device is in the form of a rebound member. In the present construction, a distendable tube 45 is employed and said tube travels with the beams 28 and is in coacting relation with all thereof. While a distendable tube pneumatically energized would be within the purview of this invention, there are certain advantages in employing a tube that is hydraulically distended. In the present form of the invention the tube 45 is circular, as shown in Fig. 1, and extends beneath all of said beams 28. A half housing 46, mounted on base 20, supports the tube 45 against a too great radially inward or outward distortion and maintains it in an operative position.

In the present construction, the tube 45 is distended by a head pressure of liquid so that the distending pressure is uniform throughout the circular length of the tube and the latter is responsive to various individual pressures of the various beams 28.

Thus, a stand pipe 47, is employed and is in communication with tube 45, by a connection 48, near the lower end of said stand pipe, as shown in Figs. 1 and 2. As the tube 45 travels, the stand pipe should advantageously turn and a supporting member 49, is suitably mounted at 50, and has a collar 51, in which the stand pipe is rotatable. Said stand pipe has a flange 52 which bears on the upper end of collar 51. In cases where it is desirable to have a greater or less hydraulic head pressure, it is a feature of the invention to make provision for such adjustment.

Thus, an extension pipe 53, internally telescopes stand pipe 47, and is vertically adjustable to different heights therein. A suitable clamp 54, holds the extension pipe 53, in its adjusted position and a packing gland 55, prevents leakage from said pipes, as will be clear from the disclosure and purpose thereof herein made. In order to take care of displacement of the liquid and provide for uniform pressure irrespective of the adjustment of pipes 47 and 53, a receiver 56, is mounted on pipe 53, and is in communication therewith. The volume of liquid is such that as a result of any pressure on tube 45, liquid will flow upwardly into receiver 56. If it were not for this receiver, pressure of all the beams 28, on tube 45, would either force liquid out of the top of pipe 53, or the stand pipe would have to be too high and thus impart too much pressure on the tube 45, in accordance with the function to be performed.

It will now be clear that with this equalizing receiver 56, which permits the liquid to spread without appreciably increasing head pressure, either a few or all of the weighing beams could be in pressure-load contact with tube 45 and yet the head pressure and that pressure that distends the tube 45, would always be practically the same. This distension of the tube 45, is herein termed "hydraulic" because the liquid is moving.

Reference will next be made to the manner in which the beams 28 coact with tube 45.

In order to obtain a maximum responsive action of the tube 45, on the beams 28, the latter are each provided with a tube contact device wherein the area of actual engagement is reduced to a minimum. Thus, as shown in Fig. 4, the bottom of each beam 28, is provided with a contact strip 57 which is anchored to the beam at 58. This contact strip not only extends transversely of the axis of tube 45, but it is curved convexly from beam 28 and it is by this arrangement possible to restrict the area of contact to a minimum and obtain the most individually responsive rebound action of the tube 45. When the beams 28 are not loaded, the tube 45 tilts the beams into the position shown in Fig. 4, against the bights 43, of the propulsive guides, although the tube 45 is very slightly indented. When an entity is placed in the holder of the beam, the weight tilts the beam downwardly, as shown at the right of Fig. 2, and further indents the tube 45.

Reference will next be made to the novel holders with one of which each weighing beam is equipped.

As the holders for all of the beams 28 are identical in structure and form, only one need be described in detail and reference will be made to Figs. 3, 4 and 5.

The radially outer end of beams 28 is bifurcated, the bight thereof being indicated at 59 and one limb at 60 and the remaining limb at 61. The free ends of the limbs are not structurally connected. This bifurcated end is equipped with an entity holder or carrier which is shown, in the present construction, to be in the form of a pocket. In the most improved construction, this pocket, as shown, is an ejecting or discharge pocket and preferably, the discharge is effected by gravity. Hence, the pocket is a two part pocket. One part, which will be first described, is what will be termed the holding part, and the other part is the releasing part.

The holding part is made of fabric, preferably canvas, and consists of a strip of canvas 62, having a side margin 63 that is secured by means such as tacks 64 to limb 61. An inner end margin 65, is likewise secured across the under side of bight 59 and extends to point 66. An outer margin 67, extends from limb 61, to limb 60, to which latter the corner portion is secured at 68. The arrangement is such that enough slack is provided so that the body of the holder portion pendently hangs from the lines of anchorage heretofore set forth. The free margin is indicated at 69.

In the absence of some effective provision, this flexible pocket holder portion would not offer any resistance to the weight of an entity, besides the delivery portion yet to be described, and reference will next be made to an important expedient coacting with the holder portion.

A stiffening rod 70, is hinged at 71, to the bottom of limb 61, at the upper end of said rod, the lower end being hingedly connected at 72 to the lower margin of the holder portion 62, at the lower apex 73, thereof. Thus, the rod 70, maintains the lower apex 73 in a substantially definite position, namely, in a substantially fixed radial location from the beam hinge 29 and hence the entity will, in dropping into the pocket, always seek the lowest portion and will impose its weight at a fixed lowest portion of the pocket and at a fixed radial distance from the hinge 29, thereby causing the beam 28 to exercise a uniform leverage against the tube 45. This makes for accurate weight classification with a pocket large enough to hold a wide range of size of the entities. If it were not for some such provision, a large or small entity, in falling into the pocket, might be disposed at a considerable variable radial distance from the beam hinge and this would preclude an accurate and uniform weighing for classification and segregation purposes. The rod 70, is preferably of rigid material although if it is desired, it can be made of spring stock whereby it will yield. At any rate, the hinged connection of the rod permits the holder portion 62 to move to the right of Fig. 5, when an entity is being discharged.

The discharge portion of the pocket includes as shown, a sheet metal frame, shown in Fig. 11, having a linear upper part 74 and a semi-circular part 75 over which canvas 76, is stretched, to afford a soft cushioning surface. This semi-circular discharge portion presents a flat plane to the edge 69 of the holder portion, and coacts therewith, through the medium of rod 70, to retain an entity in the pocket until the entity is moved by the beam into a position to be discharged.

The discharge portion of the pocket is hinged at 77 to the bottom of limb 60, to swing to the left of Fig. 5, as shown by dotted lines, to permit gravity discharge of an entity downwardly through the pocket. In order to retain the discharge portion in an entity holding or supporting position, the frame member 74, has a flange 78 extending upwardly and provided with a bend over margin 79, the latter being adapted to be disposed against the top of limb 60, as clearly shown in Figs. 3 and 5. This is the position occupied when the pocket is receiving an entity and until the latter is discharged.

Reference will next be made to the manner and means for retaining or holding the retainer bend over flange 79 in the position shown in Fig. 3, and in later releasing it.

A releasing arm is pivoted at 80 to limb 60, and the radially inner end 81, of said arm is adapted to overlap the retainer flange 79 when the arm is in the retaining position shown in Fig. 3, and hold the discharge portion of the pocket in a closed position as shown in Fig. 5, in full lines. A guard 82, may be provided not only to act as a stop, but to take the stress off from arm 81, in retaining the flange 79 in a pocket closing position. A spring 83, anchored to limb 60, at 84, and engaging the outer or trip end 85, of said arm, may serve to restore the latter to a retaining position, as shown in Fig. 3. It will be noted by reference to Figs. 3, 4 and 9, that the trip end 85 of said arm extends very appreciably beyond the end of limb 60, for a purpose that will presently be described.

Reference will next be made to the manner and means for selectively tripping arms 85 of the several beam arm pockets to cause discharge of entities of one weight into a bin, and causing entities of other weights to be deposited in other bins, with a view of sizing classification and segregation of the entities, in accordance with the weight thereof.

What will be termed trip blocks, designated at 86, are mounted on an annular support 87, which, as shown in Fig. 2, is mounted on frame members 3, as indicated at 88. The number of blocks 86, will in some installations equal the number of bins, designated at 4 to 10. In most installations however there will be many more beams 28 than blocks 86 as one block, and the means coacting therewith, may and will, function with a plurality of beams. In Fig. 1, I have shown one block super-adjacent each bin. As all of the blocks 86 are alike in structure and function only one need be described in detail.

Figure 7:
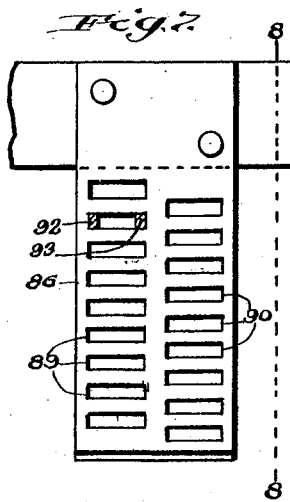
Fig. 7 is a sectional view on line 7—7 of Fig. 2, looking toward the right thereof.
Figure 8:
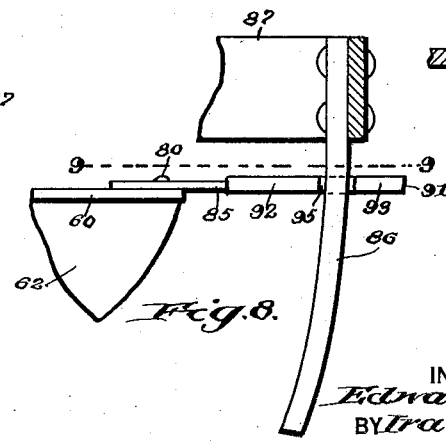
Fig. 8 is a sectional view on line 8—8 of Fig. 7, looking toward the left thereof.

Referring to Figs. 7, 8 and 9, it will be seen that the block 86 is elongated in form and slightly arcuate, the arch being struck from the hinge axis 29, of the beams 28. Viewing Fig. 7, it will be seen that the block 86 is provided with two series of slots 89 and 90, the slots of one series being in slightly or in sufficient offset relation to those of the other series to afford a close range of trip locating adjustment. A spring trip is herein shown consisting of a U-shaped member the bight of which is indicated at 91, in Fig. 9, and one limb at 92 and the remaining limb at 93. The limbs 92 and 93 have lugs 94 and 95, respectively, adapted to engage opposite faces of block 86 to rigidly hold the trips in position, after the trips are inserted through the block 86, as shown in Fig. 9.

The limb 92 projects radially inwardly beyond the block, as shown at 96 and this portion constitutes the trip portion. This trip portion is provided with an angle end 97 along which the trip arm 85 may ride so that the discharge portion of the pocket will be held open long enough to insure delivery of the entity.

Now it will be clear that if it is desired to discharge an entity of a certain weight, which of course would be of substantially a given size, into bin 5, for instance, then the corresponding trip device would be inserted in a slot in its block that would dispose the trip device at an elevation that would cause the trip arm 85 to be engaged by said trip device. It will be clear that an entity of a given weight would tilt the beam 28, from the horizontal to a given angle, such for instance as shown at the right of Fig. 2, to dispose the trip arm in the path of the trip device set or adjusted for it.

In order to cushion the fall of the entities from the pockets, a trailing apron 98 is provided beneath each pocket and an apron arm 99 is provided to carry the apron. This arm 99 is secured at 100, to the bottom of base 20 so that it will always be in a predetermined relation to the beams 28. Where the beams 28 are closely disposed, one apron 98 may function for several pockets. These aprons 98 trail over the partitions 15 of the bins and catch the entities between the ends of the aprons. This feature, however, is only shown to make the disclosure efficiently operative and is not claimed herein.

Reference will next be made to the manner and means of delivering entities to the pockets while the latter are advancing along their path of travel.

In Fig. 2, a conveyer 102 is shown trained over a roller 103 and the upper lap being supported at 104. The entities are discharged by the conveyer belt onto a series of tangs 105 which project between the tangs 106 of a delivery wheel 107. The tangs 106 are suitably curved, as shown, to receive the entities from the fixed tangs 105 and carry them over and discharge them into the pockets of the weighing beams as the former come into receiving registry with said delivery wheel. The wheel 107 is rotated in such timed relation with respect to the rate of travel of the pockets as to deposit an entity into the latter without having to arrest the base 20, as will be clear to anyone skilled in the art.

In order to insure a predetermined position of the beam that is in an entity receiving position, that is, in the matter of elevation, a stabilizng track 108, inclined upwardly from its free end 109, is disposed in the path of the beams as they approach the wheel 107 and the beam rides upwardly on said track into a fixed position of elevation. Just after the entity has been deposited in the pocket, the beam rides off from the track and seeks a tilted position dependent upon the weight of the entity in the pocket thereof. This stabilizing track, which is merely a segment, is shown mounted on a bracket 110, mounted upon upright 3, as shown at the left of Fig. 2, the track being shown in plan, in Fig. 1.

While the operation of the invention may be clear from the foregoing description, it will be briefly recapitulated.

The fruit or vegetable entities will be placed on the conveyor 102, by hand irrespective of any sequence and the tangs 106 will pick up the entities one by one and deliver them into the pockets of beams 28, as said pockets are advanced into a receiving position, it being understood that all interdependent parts are driven in timed relation. Each pocket is disposed and held in position by track 108, and after being advanced off from said track 108, and in a contra-clockwise direction viewing Fig. 1, the weight of the entity will cause the beam 28 to tilt to a certain extent.

The adjustable and fixed devices 97 will be positioned so as to be in line with arms 85 of those beams tilted to the maximum, the medium or minimum, or any variation thereof, to trip such arms as come into engagement therewith. As an example, it may be assumed that bin 4, is to receive the entities of greatest weight and hence the largest size, and the remaining bins are to receive those of lesser weight and size, hence, the devices 97 will be located in the slots 89 or 90, of blocks 86, accordingly.

It will now be clear that it is because of the structure above described, that it is not necessary to deliver the entities in any predetermined order to the weighing devices.

As the entities are discharged, as heretofore described, they drop on the aprons 98, and the latter release them gently upon the false bottoms 16, of the bins, in which latter, the entities that have been segregated, are finally separated and classified, as will now be clear.

It is believed that the invention will be fully understood from the foregoing description, and while only one specific form thereof has been shown, it is not desired that the invention be limited thereto except for such limitations as the claims may impart.

We claim:

1. In a mechanism for segregating different sized fruit or vegetable entities according to the weight thereof, a series of weighing beams each having a receiver for an entity, and a fluid pressure rebound device common to all of said beams and yielding under weight of each thereof in accordance with the weight of the entity in the respective receiver.

2. In a mechanism for segregating different sized fruit or vegetable entities according to the weight thereof, a travelling weighing beam having means for carrying an entity, and a fluid pressure flexible rebound device travelling with said beam and engaging a broad area portion of the latter and yielding to tilting movement thereof under the weight of the entity carried thereby.

3. In a mechanism for segregating different sized fruit or vegetable entities by weight, a series of travelling weighing beams each having means for carrying an entity, and a fluid pressure rebound device travelling with said beams and engaged by each and yielding under individual weight of the latter.

4. In a mechanism for segregating different sized fruit or vegetable entities by weight, a series of weighing beams travelling about a common center and each having means for carrying an entity, and a circular fluid pressure rebound device travelling with said beams and engaged by each thereof and yielding under individual pressure of the latter.

5. In a mechanism for segregating different sized fruit or vegetable entities according to the weight thereof, a series of weighing beams each having a receiver for an entity, a fluid pressure rebound device common to all of said beams and yielding under weight of each thereof in accordance with the weight of the entity carried thereby, and a series of devices for causing discharge of the entities from their receivers at predetermined and separate points of deposition in accordance with the weight of the entities.

6. In a mechanism for segregating different sized fruit or vegetable entities according to the weight thereof, a series of travelling weighing beams each having a receiver for an entity, a yielding device common to and constantly engaged by all of said beams and yielding under the weight of each to correspondingly tilt the various beams in accordance with the weight of the entity carried thereby, and a series of devices for causing discharge of the entities from their respective receivers at predetermined and different points of deposition in accordance with the weight of such entities.

7. In a mechanism for segregating different sized fruit or vegetable entities according to the weight thereof, a series of weighing devices each having a receiver for an entity, a yielding mechanism common to and supporting all of said devices and individually yielding to each thereof in accordance with the weight of the entity carried thereby, and instrumentalities for effecting discharge of entities from said receivers in accordance with their weight.

8. In a mechanism for segregating different sized or vegetable entities in accordance with the weight thereof, a series of travelling tiltable beams each having an entity holder, a flexible tube travelling with and common to all of said beams and being filled with a liquid to distend said tube for engagement and support by the latter of all of said beams in a uniform position and adapted to variously yield to permit more or less tilt of individual beams responsive to the weight of the entity carried thereby, a stand pipe open to atmosphere and connected with and rising from said tube and adapted to contain the liquid to afford a constant head thereby insuring constant distending pressure in said tube, a substantially horizontal spreading surface opening to the top of said stand pipe for overflow therefrom or back flow thereinto, and mechanism for causing discharge of entities from said holders.

9. In a mechanism for segregating different sized fruit or vegetable entities in accordance with the individual weight thereof, a series of travelling tiltable beams each having an entity holder, a flexible tube travelling with said beams and common to all thereof and being filled with a fluid to distend said tube for engagement and support by the latter of all of said beams in a substantially uniform position and adapted to yield to permit more or less tilt of individual beams responsive to the weight of the entity carried thereby, and means for causing discharge of the entities from said holders with entities of given sizes deposited at different points of deposition.

10. In a mechanism for segregating different sized fruit or vegetable entities, weighing devices including travelling beams each having an entity receiving and releasing pocket pendent therefrom, said pocket comprising a holding portion of fabric having free marginal portions opening laterally, and a flat plane closing portion movable toward the free margin of said holding portion to retain the entity and away therefrom to release the entity.

11. In a mechanism for segregating different sized fruit or vegetable entities, weighing devices including travelling beams pivoted to tilt about axes and each beam having an entity receiving and releasing pocket pendent therefrom, said pocket comprising a loose fabric holding portion opening laterally and tapering to a lower apex, a stiffening rod connected with said beam and the apex of said holding portion and normally acting to sustain said apex in a receiving portion to cause the entity to be located at a definite distance from the pivotal axis of said beams, and a discharge portion hinged to said beam and movable toward said holding portion to retain the entity and away therefrom to release the entity from said pocket.

12. The herein-described method of segregating fruit or vegetable entities of different size by weight, which consists, in delivering entities, in automatically, individually and hydraulically weighing all the delivered entities by a common hydraulically weighing medium in supplying an adjustable head of the hydraulic weighing medium, and in depositing the weighed entities in separated points of deposition to segregate entities of one size from those of another size.

13. In a mechanism for segregating different sized fruit or vegetable entities according to the weight thereof, a travelling casing containing a liquid, and a weighing device travelling with said casing and having means for carrying an entity and constantly engaging said casing to flex or deform the latter to a greater or less extent against the liquid therein dependent upon the weight of the entity in said means.

14. In a mechanism for segregating different sized fruit and vegetable entities according to the weight thereof, a travelling casing containing a liquid to inflate the former, and a series of weighing devices travelling with said casing and each having a means for carrying an entity and each device coacting with said casing to flex or deform the contour of the latter against the resistance of the liquid contained therein dependent upon the weight of the entity in the means of the respective weighing device.

15. In a mechanism for segregating different sized fruit and vegetable entities according to the weight thereof, a travelling rebound device under constant fluid pressure, and a weighing member travelling with said device and having means for carrying an entity and coacting with said device against the fluid pressure therein for weighing the entity carried by said means.

16. In a mechanism for segregating different sized fruit or vegetable entities according to the weight thereof, a travelling rebound device under fluid pressure, and a weighing device travelling with said rebound device and having means for carrying an entity and having broad area engagement with said rebound device to determine the weight of the entity in said means irrespective of whether the mechanism is precisionly levelled.

17. In a mechanism for segregating different sized fruit or vegetable entities according to the weight thereof, a travelling rebound device under fluid pressure, a weighing member travelling with said rebound device and having means for carrying an entity and engaging said rebound device more or less in accordance with the weight of the entity carried in said means, and stationary mechanism for supplying pressure fluid to said travelling rebound device.

18. In a mechanism for segregating different sized fruit or vegetable entities according to the weight thereof, a travelling casing containing a liquid under pressure to inflate said casing, a series of weighing beams travelling with said casing and each having an entity carrier and each beam engaging said casing to deflate the latter in accordance with the weight of the entity in its carrier, and stationary head pressure mechanism adjustable for supplying different degrees of liquid pressure to said casing.

19. In a mechanism for segregating different sized fruit or vegetable entities in accordance with the weight thereof, a series of travelling tiltable beams each having an entity holder, a flexible tube travelling with and common to all of said beams and being filled with a liquid to distend said tube for engagement with all of said beams and adapted to variously yield to permit more or less tilt of individual beams responsive to the weight of the entity carried thereby, a stand pipe open to atmosphere and connected with and rising from said tube and adapted to contain the liquid to afford a constant head thereby insuring constant distending pressure in said tube, and mechanism for causing discharge of entities from said holders.

20. In a mechanism for segregating different sized fruit or vegetable entities in accordance with the weight thereof, a series of travelling weighing devices each having an entity holder, a flexible tube travelling with and common to all of said devices and being filled with a liquid to distend said tube for engagement with all of said entities and adapted to variously yield to permit more or less movement of said weighing devices responsive to the weight of the entity carried thereby, a stand pipe connected with and rising from said tube and adapted to contain liquid to supply said tube under head pressure, means for extending or contracting said stand pipe to vary the constant pressure in said tube from a relatively high to a relatively low constant pressure, and mechanism for causing discharge of entities from said holders.

In witness whereof we have hereunto set our hands.

EDWARD A. WHITE.
IRA W. KNIGHT.